United States Patent
Storch

(10) Patent No.: US 7,990,630 B2
(45) Date of Patent: Aug. 2, 2011

(54) LENS DEVICE

(75) Inventor: David Robert Storch, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 210 days.

(21) Appl. No.: 12/393,189

(22) Filed: Feb. 26, 2009

(65) Prior Publication Data

US 2010/0214674 A1    Aug. 26, 2010

(51) Int. Cl.
*G02B 7/02*    (2006.01)

(52) U.S. Cl. ....................................................... 359/811

(58) Field of Classification Search .......... 359/811–830; 393/811–830
See application file for complete search history.

(56) References Cited

U.S. PATENT DOCUMENTS

| | | | |
|---|---|---|---|
| 4,868,727 A | 9/1989 | Ponds et al. | |
| 6,017,136 A | 1/2000 | Burton | |
| 6,206,543 B1 | 3/2001 | Krogman | |
| 6,267,491 B1 | 7/2001 | Parrigin | |
| 6,511,213 B1 * | 1/2003 | Maley, Sr. | 362/374 |
| 6,588,920 B2 | 7/2003 | Agro | |
| 6,652,124 B2 | 11/2003 | Schubert et al. | |
| 7,284,887 B2 * | 10/2007 | Fladhammer | 362/515 |
| 2006/0133079 A1 | 6/2006 | Callahan | |

FOREIGN PATENT DOCUMENTS

EP    1376184 A2    1/2004

* cited by examiner

*Primary Examiner* — Scott J Sugarman
*Assistant Examiner* — Vipin M Patel
(74) *Attorney, Agent, or Firm* — Black Lowe & Graham PLLC

(57) ABSTRACT

Device facilitating quick and easy removal of a lens from a front side. The device includes a lens, a housing, a retention clip, an ejection block, and a fastener. The fastener passes through a hole in the housing and the ejection block. The fastener and either the housing or the ejection block have compatible threading. Rotation of the fastener in one direction causes the ejection block to release the retention clip, thereby allowing the lens to be removed. Rotation in a second direction causes the ejection block to return to a position capable of receiving the retention clip.

14 Claims, 3 Drawing Sheets

LENS DEVICE

BACKGROUND OF THE INVENTION

When it comes to aircraft lighting products, weight, cost, and life are three important considerations to aircraft owners. To reduce weight, many aircraft lighting products use plastic lenses instead of glass lenses. These lenses occasionally need to be removed, due to lens replacement or other light maintenance. Often, these lenses are attached to the aircraft by a metal retainer, which adds weight and costs to the device.

One other lens retention method involves molding retention clips into the lens itself, allowing the lens to snap into place when installed. The use of molded clips eliminates the need for a lens retainer thereby reducing weight and installation time; however, once the lens is installed, removing the lens is labor intensive because the molded clips are only accessible from the back or sides of the assembly. In addition to significant labor costs, lens removal from the back or sides is also undesirable because it increases the risk of accidental damage to the lens or other systems or devices located near the lens.

SUMMARY OF THE INVENTION

The present invention provides a lens device for quick and easy removal and/or replacement of a lens from a front side of a housing.

An example device includes a lens, a housing, a retention clip, an ejection block, and a fastener. The retention clip extends from the periphery of the lens. The fastener passes through a hole in the housing and the ejection block. A first end of the fastener is accessible from the front side of the housing. The retention clip has a latch and the housing has a catch. The latch and catch are configured to possibly retain the lens to the housing depending on the position of the ejection block relative to the housing.

In accordance with other aspects of the invention, the fastener is threaded.

In accordance with still further aspects of the invention, the hole in the housing has compatible threading relative to the fastener. Rotation of the fastener in one direction causes the ejection block to release the retention clip, thereby allowing the lens to be removed. Rotation in a second direction causes the ejection block to return to a position capable of receiving the retention clip.

In accordance with yet other aspects of the invention, the hole in the ejection block has compatible threading relative to the fastener. Rotation of the fastener in one direction causes the ejection block to release the retention clip, thereby allowing the lens to be removed. Rotation in a second direction causes the ejection block to return to a position capable of receiving the retention clip.

In accordance with still another aspect of the invention, the ejection block does not rotate with the fastener.

In accordance with still further aspects of the invention, the retention clip has a flange shape.

BRIEF DESCRIPTION OF THE DRAWINGS

Preferred and alternative embodiments of the present invention are described in detail below with reference to the following drawings:

FIGS. 2-1 and 2-2 are partial cross-sectional views showing the lens, lens retention clip, ejection block, housing, and fastener formed in accordance with embodiments of the present invention; and FIGS. 3-1 and 3-2 are partial cross-sectional views showing an alternate configuration of the present invention.

DETAILED DESCRIPTION OF THE INVENTION

Figure 1:
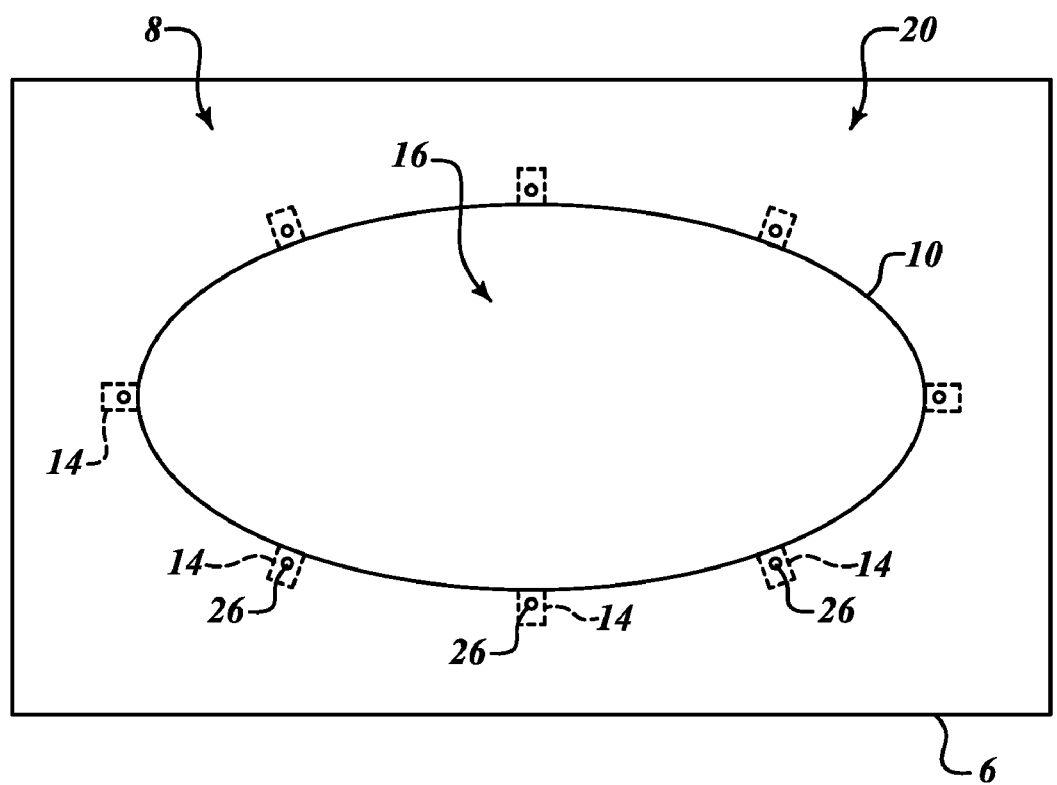
FIG. 1 is a top view showing a front side of a portion of a lens device formed in accordance with an embodiment of the present invention.

FIG. 1 shows a front side 8 of an assembly 6 containing a housing 20, a lens 10 having a body 16, and a plurality of lens devices 14. The housing 20 is capable of receiving the lens 10. The housing 20 includes a first surface 28. Each lens device 14 includes a threaded fastener 40. The threaded fastener 40 includes a first end 26 capable of receiving a hex head wrench. The first end 26 rests on the first surface 28 of the housing 20. The lens devices 14 are positioned around the periphery of the body 16 of the lens 10. The lens 10 is attached and detached to the housing 20 using the lens device 14. The lens device 14 and the lens 10 are accessible from the front side 8, which is also where the body 16 is accessible. The lens 10 is made out of flexible material such as, but not limited to, plastic or Plexiglas.

Figures 1, 2:
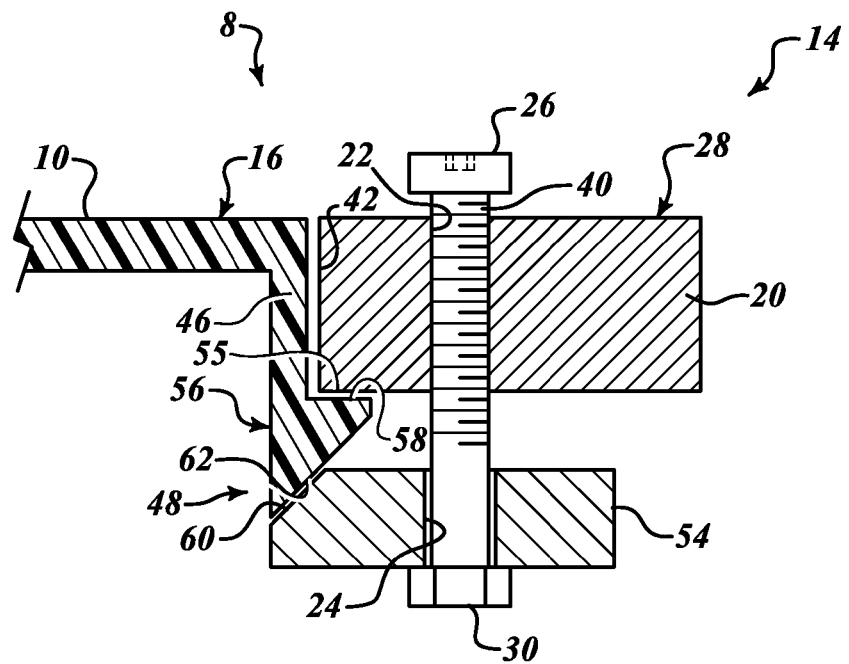
Figure 2:
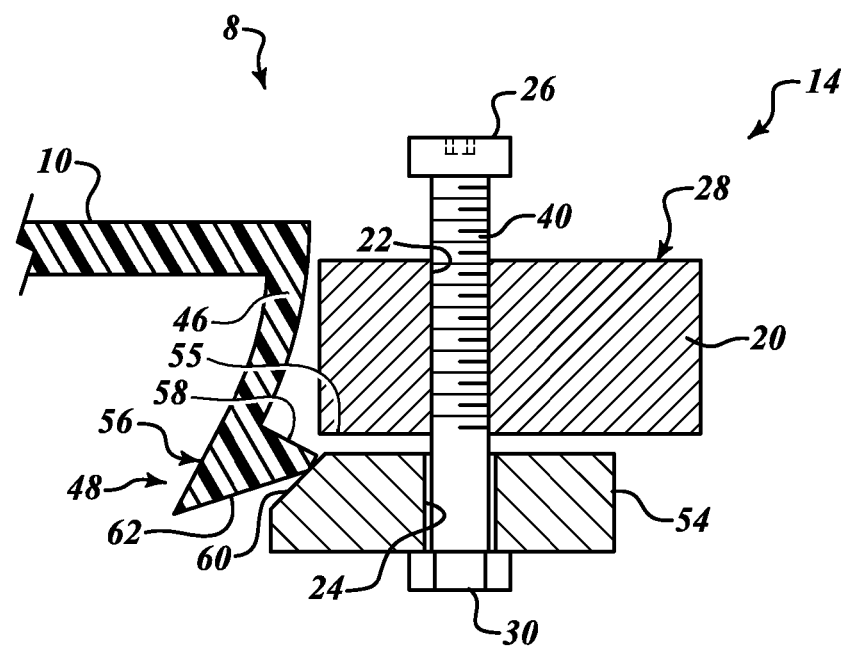

FIGS. 2-1, 2-2 show one embodiment of the lens device 14. The lens device 14 includes the lens 10, a retention clip 48, an ejection block 54, the threaded fastener 40, and the housing 20. The retention clip 48 extends from the periphery of the body 16 of the lens 10. The retention clip 48 is part of the lens 10. In this embodiment, the retention clip 48 and the lens are made of the same material.

The threaded fastener 40 passes through a threaded hole 22 in the housing 20 and an unthreaded hole 24 in the ejection block 54. The threaded fastener 40 includes a second end 30 having a radius substantially larger than the radius of the unthreaded hole 24 that prevents the second end 30 from entering the unthreaded hole 24, thereby keeping the ejection block 54 from disengaging from the threaded fastener 40. Alternatively, the ejection block 54 may be prevented from disengaging from the threaded fastener 40 by preventing the second end 30 from entering the unthreaded hole 24 by utilizing a clip, snap ring, or pin in the second end 30. The threaded fastener 40 may be partially threaded; specifically, the portion of the threaded fastener 40 passing through the unthreaded hole 24 is not threaded.

More specifically, FIG. 2-1 shows the lens device 14 with the lens 10 and the retention clip 48 in a latched position. The lens 10 is attached to the housing 20 using the lens device 14. In the latched position, the retention clip 48 is relaxed. The retention clip 48 has a latch 56, which has a flange section 58. In the latched position, the flange section 58 of the latch 56 is retained by a catch 55, thus holding the lens 10 in place. The ejection block 54 includes an ejection guide 60. The retention clip 48 has an edge 62 below the flange section 58. In the latched position, the edge 62 is not in contact with the ejection block 54.

Rotation of the threaded fastener 40 in a first direction causes the threaded fastener 40 to move within the threaded hole 22 in a direction parallel to the threaded hole 22. Correspondingly, the ejection block 54 moves vertically with the threaded fastener 40 but does not rotate with the threaded fastener 40, i.e. the ejection block 54 is pulled towards the housing 20 by the threaded fastener 40. As the ejection block 54 moves towards the housing 20, the ejection guide 60 slides along the edge 62, forcing the retention clip 48 to bend at an elbow 46 thereby moving the flange section 58 away from the threaded fastener 40. More specifically, the ejection guide 60 pushes the latch 56 away from the catch 55. After sufficient rotation of the threaded fastener 40 and corresponding movement of the ejection guide 60 and retention clip 48, the latch 56 is pushed beyond the catch 55.

FIG. 2-2 shows the retention clip 48 in a substantially unlatched position occurring after the ejection block 54 has forced the release of the latch 56 from the catch 55. In this position, the lens 10 may be removed from the housing 20 on the front side 8. When the lens 10 is removed, the lens device 14 can be adjusted to receive the lens 10 or a new lens by rotating the threaded fastener 40 in a second direction until the ejection block 54 returns to the position shown in FIG. 2-1.

Figures 1, 3:
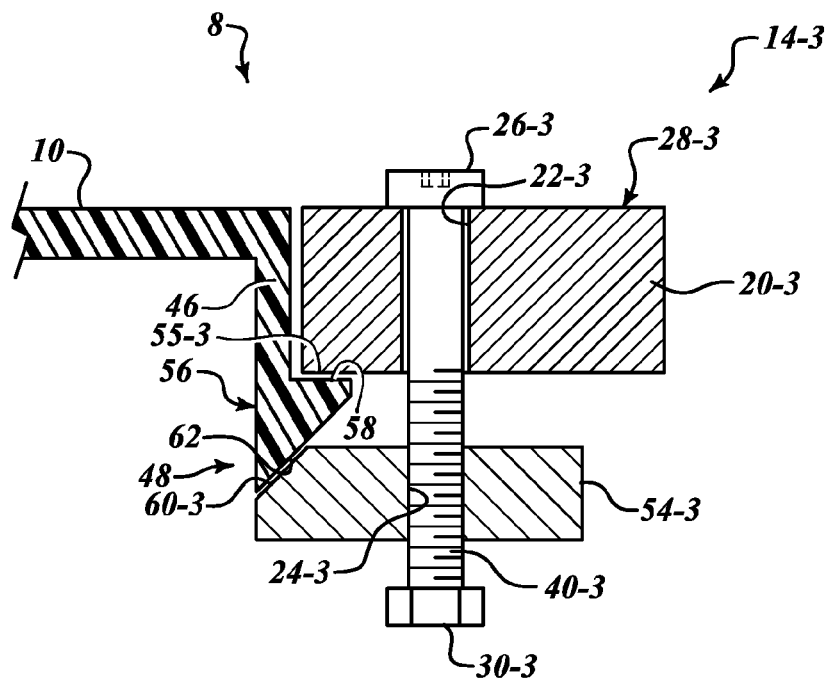
Figures 2, 3:
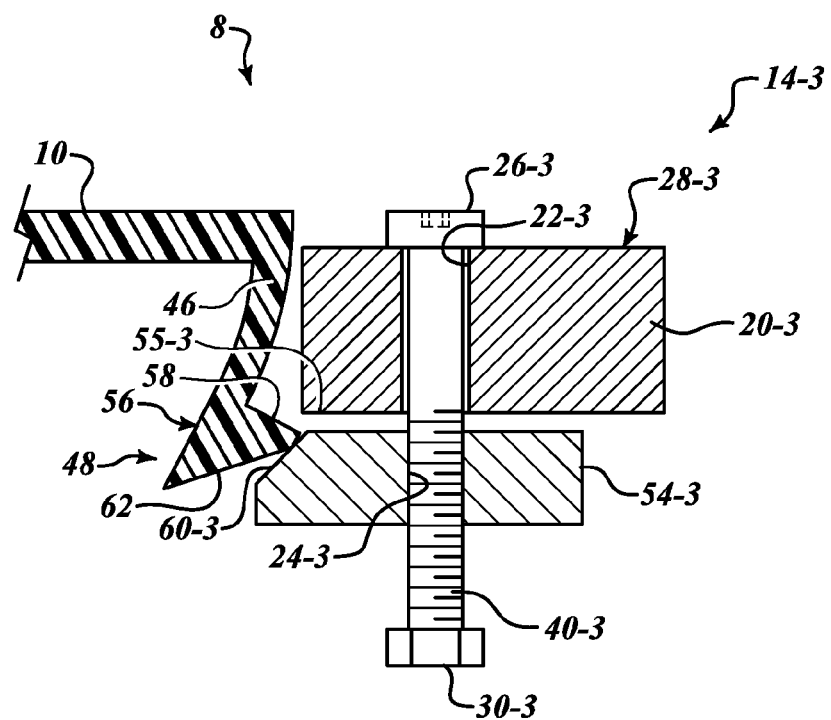

FIG. 3-1 shows an alternative embodiment of a lens device 14-3. The lens device 14-3 includes the lens 10 containing the retention clip 48, an ejection block 54-3, a threaded fastener 40-3, and a housing 20-3.

The threaded fastener 40-3 passes through an unthreaded hole 22-3 in the housing 20-3 and a threaded hole 24-3 in the ejection block 54-3. The threaded fastener 40-3 includes a second end 30-3 that restrains vertical motion of the threaded fastener 40-3, thereby keeping the ejection block 54-3 from disengaging from the threaded fastener 40-3. The ejection block 54-3 may be prevented from disengaging from the threaded fastener 40-3 with the features discussed above for the embodiment shown in FIG. 2-1. The threaded fastener 40-3 may be partially threaded; specifically, the portion of the threaded fastener 40-3 passing through the unthreaded hole 22-3 need not be threaded.

More specifically, FIG. 3-1 shows the lens device 14-3 with the lens 10 and the retention clip 48 in a latched position. The lens 10 is attached to the housing 20-3 using the lens device 14-3. In the latched position, the retention clip 48 is relaxed. The retention clip 48 includes the latch 56 having the flange section 58. In the latched position, the flange section 58 of the latch 56 is retained by a catch 55-3, thus holding the lens 10 in place. The ejection block 54-3 includes an ejection guide 60-3. The retention clip 48 includes the edge 62 below the flange section 58. In the latched position, the edge 62 is not in contact with the ejection block 54-3.

Rotation of the threaded fastener 40-3 in a first direction causes the ejection block 54-3 to move vertically along the threaded fastener 40-3. More specifically, the ejection block 54-3 is pulled towards the housing 20-3 by the threaded fastener 40-3. The ejection block 54-3 does not rotate with the threaded fastener 40-3. As the ejection block 54-3 moves towards the housing 20-3, the ejection guide 60-3 slides along the edge 62, forcing the retention clip 48 to bend at the elbow 46 thereby moving the flange section 58 away from the threaded fastener 40-3. More specifically, the ejection guide 60-3 pushes the latch 56 away from the catch 55-3. After sufficient rotation of the threaded fastener 40-3 and corresponding movement of the ejection guide 60-3 and retention clip 48, the latch 56 is pushed beyond the catch 55-3.

FIG. 3-2 shows the retention clip 48 in a substantially unlatched position occurring after the ejection block 54-3 has forced the release of the latch 56 from the catch 55-3. In this position, the lens 10 may be removed from the housing 20-3 on the front side 8. When the lens 10 is removed, the lens device 14-3 can be adjusted to receive the lens 10 or a new lens by rotating the threaded fastener 40-3 in a second direction until the ejection block 54-3 returns to the position shown in FIG. 3-1.

To install the lens 10, a user would need only to ensure that the threaded fastener 40, 40-3 and the ejection block 54, 54-3 are in the position illustrated in FIG. 2-1 or 3-1, align the lens 10, and push the lens 10 into place. Accordingly, the lens device 14, 14-3 allow for quick and easy removal of the lens 10, without any risk of damage to the lens 10 or any other nearby objects because the lens 10 may be attached or detached from the front side 8. Also, because the threaded fastener 40, 40-3 cannot be removed from the ejection block 54, 54-3 and the housing 20, 20-3 the fasteners cannot be lost while the lens 10 is attached or detached.

Each lens device 14, 14-3 has one ejection block 54, 54-3 and fastener 40, 40-3 combination per retention clip 48. In some cases, fewer ejection blocks 54, 54-3 may be needed.

While the preferred embodiment of the invention has been illustrated and described, as noted above, many changes can be made without departing from the spirit and scope of the invention. For example, other types of ends can be used on the fastener 40, 40-3 such as, but not limited to Phillips or a slot head. The entire threaded fastener 40, 40-3 could be threaded. Alternative types of fasteners could be used. Also, different quantities of lens devices 14, 14-3 could be included in the lens 10, the lens 10 could include a combination of lens devices 14, 14-3 or the parts could have different shapes or geometries, provided they perform the same function. In other aspects, the retention clip 48 could be made from a different material, including, but not limited to, other plastic or metal. The retention clip 48 could be attached to the body 16 or molded into the body 16. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A lens device comprising:
    a lens comprising a body and at least one retention clip, the retention clip comprising a latch, the latch having a first edge;
    a housing comprising a first hole, a first surface and a catch, the housing capable of receiving the lens;
    an ejection block comprising a second edge and a second hole, the second hole having a radius; and
    a fastener passing through the first hole and the second hole, the fastener comprising a first end and a second end, the second end having a radius,
    wherein the latch and catch are configured to retain the lens to the housing, depending on position of the ejection block,
    wherein the fastener is at least partially threaded,
    wherein the first hole comprises threading compatible with the fastener threading,
    wherein the first edge is configured to slide along the second edge, causing the retention clip to bend at an elbow,
    wherein the fastener is configured to rotate,
    wherein rotation in a first direction causes the ejection block to move towards the housing,
    wherein moving towards the housing causes the first edge to slide along the second edge thereby pushing the latch away from the catch.

2. The device of claim 1, wherein the retention clip is flexible.

3. The device of claim 1, wherein the latch is shaped as a flange.

4. The device of claim 1, wherein the first end is adjacent to the first surface.

5. The device of claim 4, wherein the first end is configured to receive a device for adjusting the fastener.

6. The device of claim 1, wherein moving the latch away from the catch causes the latch to release from the catch.

7. The device of claim 6, wherein at least one of the second end or the second hole is configured to prevent the second end from entering the second hole.

8. The device of claim 1 wherein the rotation in a second direction causes the ejection block to move away from the housing.

9. The device of claim 8, wherein the ejection block moving away from the housing allows the retention clip to be set with the catch, if the retention clip has not already been set.

10. A lens device comprising:
a lens comprising a body and at least one retention clip, the retention clip comprising a latch, the latch having a first edge;
a housing comprising a first hole, a first surface and a catch, the housing capable of receiving the lens;
an ejection block comprising a second edge and a second hole, the second hole having a radius; and
a fastener passing through the first hole and the second hole, the fastener comprising a first end and a second end, the second end having a radius,
wherein the latch and catch are configured to retain the lens to the housing, depending on position of the ejection block,
wherein the fastener is at least partially threaded,
wherein the second hole comprises threading compatible with the fastener,
wherein the first edge is configured to slide along the second edge causing the retention clip to bend at an elbow,
wherein the fastener is configured to rotate,
wherein rotation in a first direction causes the ejection block to move towards the housing, which causes the first edge to slide along the second edge thereby pushing the latch away from the catch.

11. The device of claim 10, wherein moving the latch away from the catch causes the latch to release from the catch.

12. The device of claim 11, wherein the ejection block is configured to not rotate with the fastener.

13. The device of claim 11, wherein rotation in a second direction causes the ejection block to move away from the housing.

14. The device of claim 13, wherein the ejection block moving away from the housing allows the retention clip to be set with the catch, if the retention clip has not already been set.

* * * * *